United States Patent [19]
Walsh

[11] Patent Number: 6,131,917
[45] Date of Patent: Oct. 17, 2000

[54] TOWING DEVICE

[76] Inventor: Paul Walsh, 4 Marina Village, Malahide, Co. Dublin, Ireland

[21] Appl. No.: 09/066,624

[22] Filed: Apr. 24, 1998

Related U.S. Application Data

[63] Continuation of application No. PCT/IE96/00068, Oct. 24, 1996.

[30]    Foreign Application Priority Data

Oct. 24, 1995  [IE]  Ireland .................................. S950830

[51] Int. Cl.$^7$ .................................................. B62D 21/14
[52] U.S. Cl. .................................. 280/DIG. 6; 280/43.1; 280/47.131; 280/47.17; 280/47.26
[58] Field of Search ............................... 280/43.1, 43.11, 280/43.24, 43.17, 47.131, 47.17, 47.24, 47.2, 47.26, 47.371, 47.38, 645, 651, 654, 646, 655, 655.1, 656–658, 204, DIG. 6, 486, 487

[56]           References Cited

U.S. PATENT DOCUMENTS

| | | | |
|---|---|---|---|
| 4,382,609 | 5/1983 | Hemmings | 280/415 A |
| 4,657,100 | 4/1987 | Lewis | 180/19.1 |
| 4,679,807 | 7/1987 | Raybon | 280/65 |
| 5,062,651 | 11/1991 | Varieur | 280/1.5 |
| 5,244,217 | 9/1993 | Kotulla | 280/1.5 |
| 5,308,103 | 5/1994 | Chin-Shung | 280/655 |
| 5,375,861 | 12/1994 | Gifford | 280/47.38 |
| 5,464,238 | 11/1995 | Wu | 280/42 |
| 5,522,615 | 6/1996 | Kazmark, Jr. et al. | 280/655 |
| 5,582,372 | 12/1996 | Wu | 248/96 |
| 5,732,443 | 3/1998 | Kazmark, Jr. et al. | 16/115 |
| 5,884,362 | 3/1999 | Tsai | 16/115 |

FOREIGN PATENT DOCUMENTS

| | | |
|---|---|---|
| 990271 | 4/1965 | United Kingdom . |
| 1461930 | 1/1977 | United Kingdom . |
| WO 86/00054 | 1/1986 | WIPO . |

*Primary Examiner*—Eric Culbreth
*Assistant Examiner*—L. Lum
*Attorney, Agent, or Firm*—Peter F. Corless; Dike, Bronstein, Roberts & Cushman, LLP

[57]               ABSTRACT

The invention relates to a towing device for a golf trolley comprising longitudinal resilient linkage means. The linkage comprises a spring, a damper for the resilient portion, the remainder of the linkage being rigid, and means at one end of the linkage for pivotal attachment of the linkage to the bag-carrying part of the trolley. The towing device may be incorporated in the handle of a trolley or may be an accessory attachable to the trolley. The damper may comprise a piston-and-cylinder type damper which may contain air or other gas or oil or other hydraulic fluid. Embodiments using telescopic cylinders are also described. The extent of pivotal movement of the towing device relative to the bag-carrying part of the trolley is restricted by a flexible link or spring. The device may be attached to a belt or other item of clothing on the trunk of a user, and the trolley may have an auxiliary wheel fitted to the bottom of the bag-carrying part. A mechanism for releasably securing the handle against pivotable or telescopic movement is also described.

17 Claims, 10 Drawing Sheets

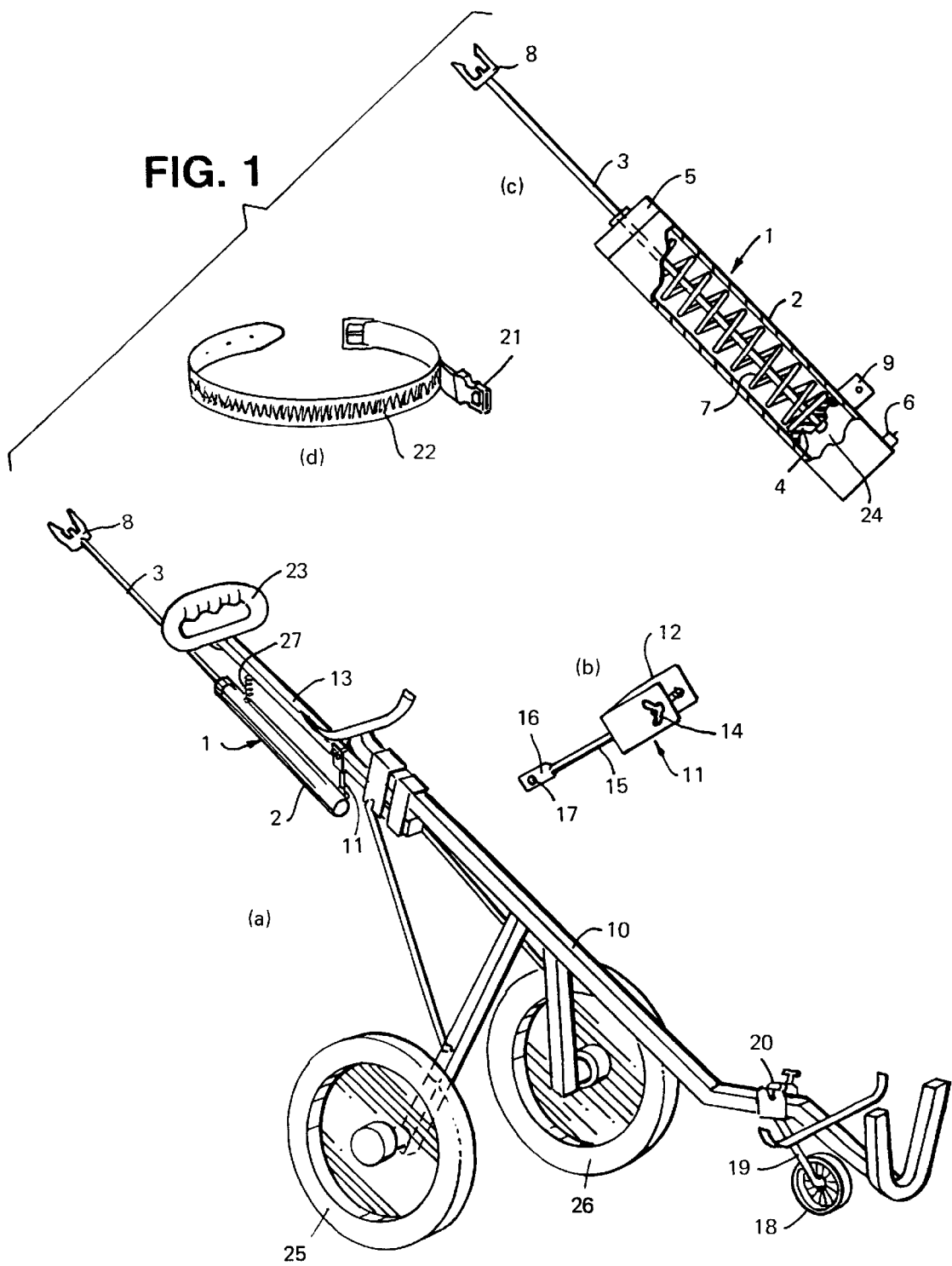

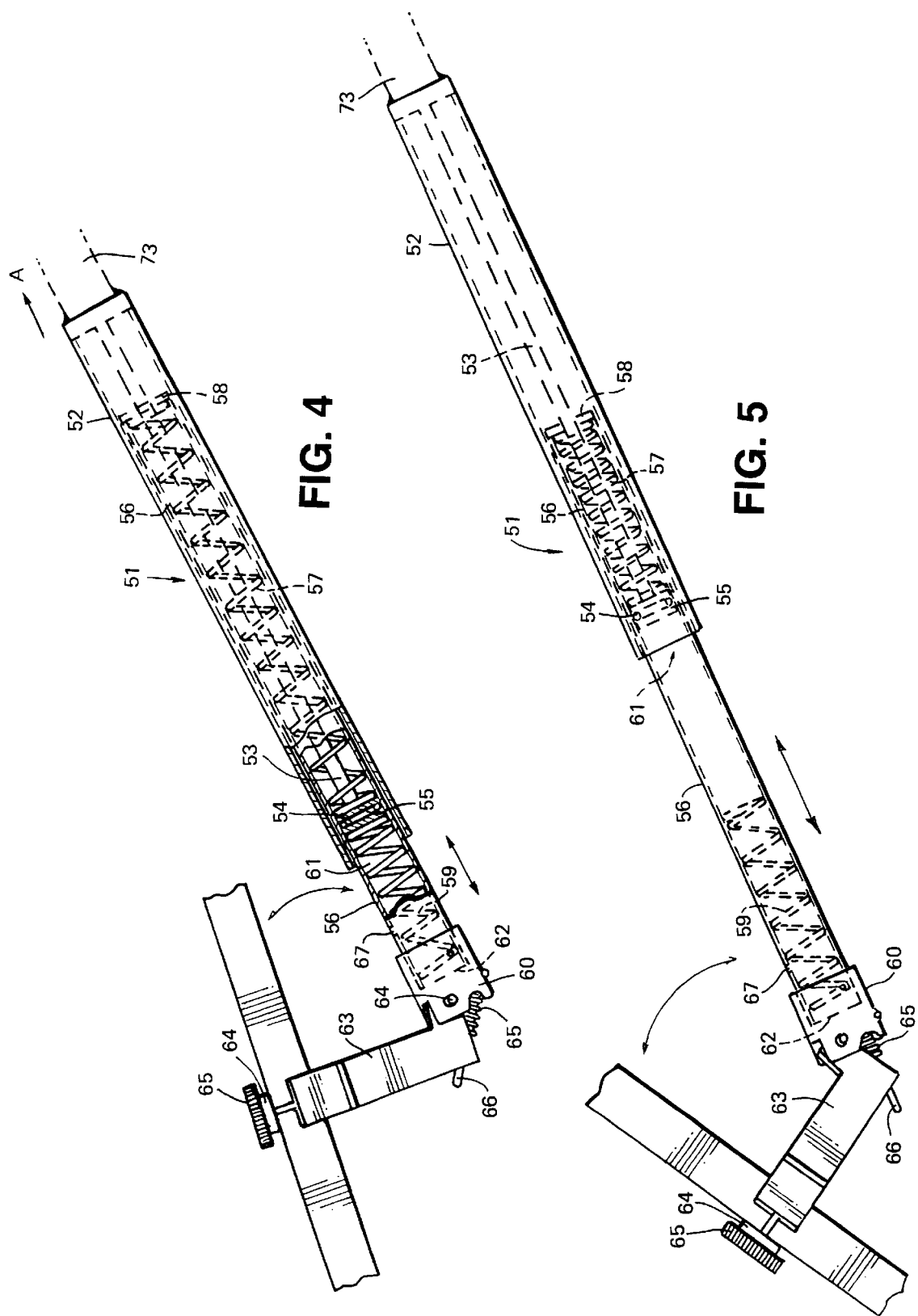

TOWING DEVICE

This is a continuation of PCT/IE96/00068 filed Oct. 24, 1996.

TECHNICAL FIELD

This invention relates to a towing device, in particular a towing device suitable for towing golf trollies and the like.

BACKGROUND ART

Hand-drawn trollies and in particular golf trollies or buggies can be quite tiring and uncomfortable to tow over a long distance. In particular golf trollies which are towed over the entire length of a golf course may be quite heavy due to the weight of the golf clubs and golf bag attached to the trolley. There is a particular problem in overcoming the inertia of the trolley, bag and clubs each time that the trolley is pulled from a stationary position, often on rough ground or on an upward slope. GB 1,461,930 relates to a trolley having a longitudinally resilient flexible linkage attached at one end of the wheeled frame and the other end attached to a belt adapted to extend around the trunk of a person drawing the trolley. The linkage may comprise a rubber or the like strap but it is preferred that the linkage should comprise a chain and a compression tension spring. In the embodiment described, a length of chain extends between two tension coil springs, one of those springs being attached to the frame of the trolley and the other being attached via a spring clip to the user's belt. GB 1,461,930 further states that while the linkage permits the load of the trolley to be taken directly by the trunk of the user, the user's hand is still required to tilt and guide the trolley.

Thus, while the load being towed is removed from the arm of the user, a hand must still be kept on the handle of the trolley which means that the uncomfortable position of walking with one hand held out behind is not relieved. Furthermore, with the arrangements suggested in GB 1,461, 930 when the user moves down an incline the trolley would tend to push forward towards the user and in order to prevent the trolley handle pushing right against the user's back the user would have to restrain its movements using his or her arm. Thus the object of substantially removing the strain from the user's arm is not achieved.

FR 2 693 967 describes a golf trolley puller which has a curved steel tube, sheathed in plastic, with a quick trolley fixing. The puller may be fastened to the player's belt by quick fastening straps. The trolley puller is designed to allow the player to pull the trolley in comfort. While the strain of towing is removed from the golfer's arm during towing of the golf trolley puller, all the effort is transferred to the golfer's torso. The trolley would be inclined to continually bump against the golfer while he/she tows it with the device described in this document.

GB 2 180 200 relates to a golf bag carrier which has a flexible spine and side struts. A connector pivotally connects the handle and the side struts to the spine. The trolley can assume a folded position. The spine is a serrated beam having intersecting orthogonal members extending along its length for bending rigidity and spaced ribs along the spine perpendicular to its axis for torsional rigidity and comprises a resilient plastic material that further absorbs shock throughout the spine. The handle and side struts are of the same design as the spine and comprise the same material. The flexible spine is designed to eliminate the transfer of vibratory and other undesired motion from the wheels through the trolley frame, thus prolonging the life of the trolley by decreasing wear and tear on its constituent parts.

None of these prior art documents describes a system for reducing the effort needed to pull or push a trolley by hand. Neither do they describe the use of such a system in combination with a towing belt or other item of clothing worn by the user.

It is very demanding on a golfer to tow or push a conventional trolley by its handle. This causes soreness and/or tiredness in a golfer's limbs and can thus affect his/her ability to play golf.

DISCLOSURE OF INVENTION

It is an object of this invention to provide a towing device, in particular a towing device for golf buggies or trollies which allows the golf trolley to be towed smoothly, counteracting and eliminating the jerking motions of the trolley caused by the inertia of the trolley when the user starts walking, walks continuously or stops walking. It is a further object to substantially reduce the effort required to tow the trolley from rest or to stop the trolley when walking. It is a further object of the present invention to provide a towing device wherein the necessity for the user to keep at least one hand on the trolley handle is substantially reduced, regardless of the inclination of the surface on which the trolley and the user are located while still allowing the golf trolley to be towed smoothly.

The present invention provides a towing device for a golf trolley comprising longitudinally resilient linkage means characterised in that the linkage comprises a resilient portion, a damper for the said resilient portion, the remainder of the linkage being rigid, and means at one end of the linkage for attachment of the linkage to the bag-carrying part of the trolley. Preferably the towing device is allowed pivotal movement relative to the trolley. More preferably, means are provided for pivotal attachment of the linkage to the bag-carrying part of the trolley.

Alternatively, pivotability may be provided in the resilient portion of the linkage.

The feature that the remainder of the linkage (other than the resilient portion) is rigid ensures that the trolley is pulled in a controlled manner, behind the user and is prevented from running up close behind the user when going downhill.

In one embodiment, the towing device is an accessory attachable to an existing golf trolley having a conventional handle. In a second embodiment, the towing device forms the handle of the trolley and is connected to the bag-carrying part of the trolley. Preferably in either embodiment the towing device is pivotally connected to the bag-carrying part of the trolley. More preferably, a mechanism is provided to restrict the extent of pivotal movement of the towing device relative to the trolley, most suitably comprising a spring or hook.

Preferably the towing device includes means at the other end of the linkage for removably attaching the towing device to a mounting device, for example a belt or other item of clothing, on the trunk of a golfer's body.

In the preferred embodiments the damper comprises a piston-and-cylinder type damper which may be filled with air or other gas, or with oil or other hydraulic fluid. A shock absorber following the principles of a motor vehicle shock absorber may be used. The damper facilitates extension of the towing device when the trolley is pulled, but resists rapid recoil of the trolley when pulling ceases, particularly when the trolley is running downhill. The amount of effort required to tow the trolley from rest or to stop the trolley moving is thus substantially reduced.

Preferably the damper incorporates a spring, more preferably a compression spring, particularly a spring which has a progressive rate of change of compressive strength, so that initial extension of the towing device requires little pulling load but the resistance of the spring to compression increases as the device is extended.

In an alternative arrangement the towing device provides a damping effect when pushed as well as when pulled.

Preferably the trolley is provided with an auxiliary wheel at the bottom of the bag-carrying part. A pair of auxiliary wheels may suitably be provided.

Preferably the towing device is attached to the golf trolley adjacent to the top of the bag-carrying part of the trolley. In the case of a towing device for use with a conventional trolley, the towing device is attached to the lower part of the handle, adjacent to the junction between the handle and the bag-carrying part of the trolley. Pulling on the towing device then lifts the top of the bag-carrying part. If desired, the upper part of the handle, above the attachment point for the towing device, may be removed so that the towing device alone is used for pulling the trolley.

Preferably also a stop mechanism is provided to restrict the extent of pivotal movement of the towing device relative to the trolley. In the case of a towing device for use with a trolley having a conventional handle, the stop mechanism may comprise a flexible or resilient link between the handle and the towing device, for example a hook or spring which supports the cylinder and/or the piston but allows limited pivotal movement of the device and free longitudinal movement of the piston.

BRIEF DESCRIPTION OF DRAWINGS

FIG. 1 shows a first embodiment of a towing device of the invention, being an accessory attached to a conventional golf trolley;

FIG. 1(a) is a pictorial view of the trolley with the towing device attached thereto;

FIG. 1(b) is an enlarged pictorial view of the connecting device by which the towing device is attached to the trolley;

FIG. 1(c) is an enlarged diagrammatic view, partly in cross-section, of the towing device;

FIG. 1(d) is a pictorial view on a reduced scale of a belt to which the towing device can be removably attached;

FIG. 4 is an elevation, partly in cross-section of a third embodiment, being an accessory attachable to an existing golf trolley, shown in the rest position;

FIG. 5 is an elevation similar to FIG. 3 showing the accessory in the extended position;

MODES FOR CARRYING OUT THE INVENTION

Figure 3:
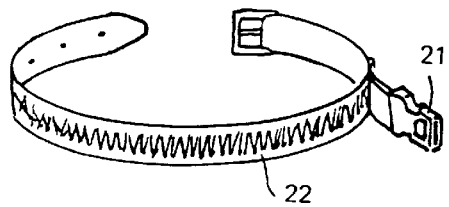
FIG. 3 is a pictorial view on a reduced scale of a belt, similar to FIG. 1(d)

With reference to FIG. 1, the towing device 1 consists of a cylindrical casing 2, a rigid piston 3 and a flexible seal 4. The piston 3 extends through an aperture in a cap 5 at the top of the cylindrical casing 2. The seal 4 is attached to the end of the piston 3 which extends into the cylindrical casing 2.

A valve 6 is also provided in the cylindrical casing 2 at its bottom end i.e. that end furthest from the cap 5. The cylindrical casing 2 is completely sealed at all places except at the aperture in cap 5 and at valve 6.

A coiled compression spring 7 is fitted within the cylindrical casing 2 so that it presses against cap 5 and flexible seal 4. The piston 3 is free to move along a longitudinal axis at the centre of the coiled spring 7. A clip 8 is fitted to piston 3 at its free end, outside the cylindrical casing 2.

As shown in FIG. 1(c), bracket 9 is secured to the outside of cylindrical casing 2 near to the bottom end. In use the towing device 1 is attached to a golf trolley 10 using connecting device 11. Connecting device 11 has a bracket 12 which fits to handle 13 of the golf trolley 10. A wing nut securing bolt 14 is used to secure connecting device 11 to the golf trolley 10. An arm 15 extends from the bracket 12 which has a plate 16 containing a hole 17. The plate 16 fits into bracket 9 on the towing device 1. A pin (not shown) is then inserted through bracket 9 and plate 16 which secures towing device 1 to the golf trolley 10. The towing device 1 is free to pivot about this pin. A flexible link 27 can be connected between handle 13 and towing device 1 to stop the towing device from falling downwards when not in use. Alternatively a stop mechanism can be used which limits the degree of freedom device 1 has to pivot about the pin. The golf trolley 10 is a two wheeled golf trolley having conventional wheels 25, 26. In order to allow the trolley to run smoothly behind a user using the towing device 1, a third wheel 18 is fitted to trolley 10 close to the end of trolley 10 which would normally sit on the ground when the trolley 10 was not being towed. The wheel 18 is secured to an axle 19 which is fitted to the frame of the golf trolley 10 by a bracket 20. Wheel 18 is adjustable and thus a user can find the ideal position to locate the wheel 18 so that the trolley 10 runs smoothly behind the user and on all three wheels. Wheel 18 keeps the trolley 10 from dragging on the ground and may be height adjustable. In the case of a three-wheeled trolley, extra wheel 18 need not be fitted.

In use the clip 8 is attached to a fastener or hitch 21 which is attached to a belt 22 worn by the user. Alternatively, the clip 8 may be so designed so as to attach directly to the clothing of the user. Alternatively, hook-and-loop fastener strips (such as sold under the trade mark VELCRO) may be used instead of clip 8 and fastener 21. Belt 22 may be adapted to also hold golf tees etc. Using a hook-and-loop fastener as the attachment means enables the user to decide whereabouts on the belt he or she wishes to connect the towing device 1.

When the user has attached him or herself to the golf trolley 10 via towing device 1 he or she may then proceed to walk freely without any necessity to keep a hand on the handgrip 23 of the trolley 10. At this stage the trolley 10 would be carrying a golf bag and clubs (not shown). As no hand is required to manoeuvre or tow the trolley 10 there is no strain on the trolley user's arm(s) and furthermore he or she can concentrate on their game. This also removes tiredness and/or soreness in the arms which might otherwise be present due to the necessity to tow the trolley by hand. This effect is accentuated on wet days when the trolley is more difficult to tow. This may help to improve the player's game as tiredness/soreness of arms will not affect his or her "swing". Continued towing using the handgrip 23 may cause a cramp or a "memory sensation" in the user's hand thus making it difficult to readjust to holding a club. A "memory sensation" is a phenomenon whereby when an object is held by hand for relatively long periods of time—especially if a relatively tight grip is used, the hand tends to return automatically to the grip used even after the object being gripped is released. This difficulty in altering one's grip is removed by the towing device 1 of the invention.

Furthermore operations such as recording a score, putting up an umbrella, lighting a cigarette or putting on or removing a jacket or glove can be done without stopping as both hands are free.

A club may be carried and various swings practised if desired while moving along the course. Both hands may be kept warm by placing them in pockets.

When the user commences walking, belt 22 tows the trolley 10 via clip 8, fastener 21 and piston 3. The coiled spring 7 is compressed by the towing motion on piston 3. This compression removes the sudden tug or pull due to the inertia of the stationary golf trolley 10 that the user would feel if he or she were directly towing the golf trolley 10 by hand or if the system described was not fitted. In order to counteract sudden recoil of the compressed spring 7, flexible seal 4 and cylindrical casing 2 define a chamber 24 which contains air. As spring 7 is compressed, air is drawn into chamber 24 and held there. When spring 7 then recoils, it is restricted from doing so in the normal manner by the air trapped in chamber 24. This trapped air may then be released slowly at a controlled rate through valve 6, thus damping and controlling the normal recoil of spring 7.

The piston-and-cylinder thus provides a damping effect for all motions of the user and/or trolley 10 which would otherwise cause sudden or jerking movements to be transmitted to the user. Alternatively, cylinder 2 could contain other gases or oil or other hydraulic fluid which would cause the towing device 1 to perform in a manner similar to that described above. In these cases the gas or hydraulic fluid within the device 1 would provide the damping effect.

Figure 2:
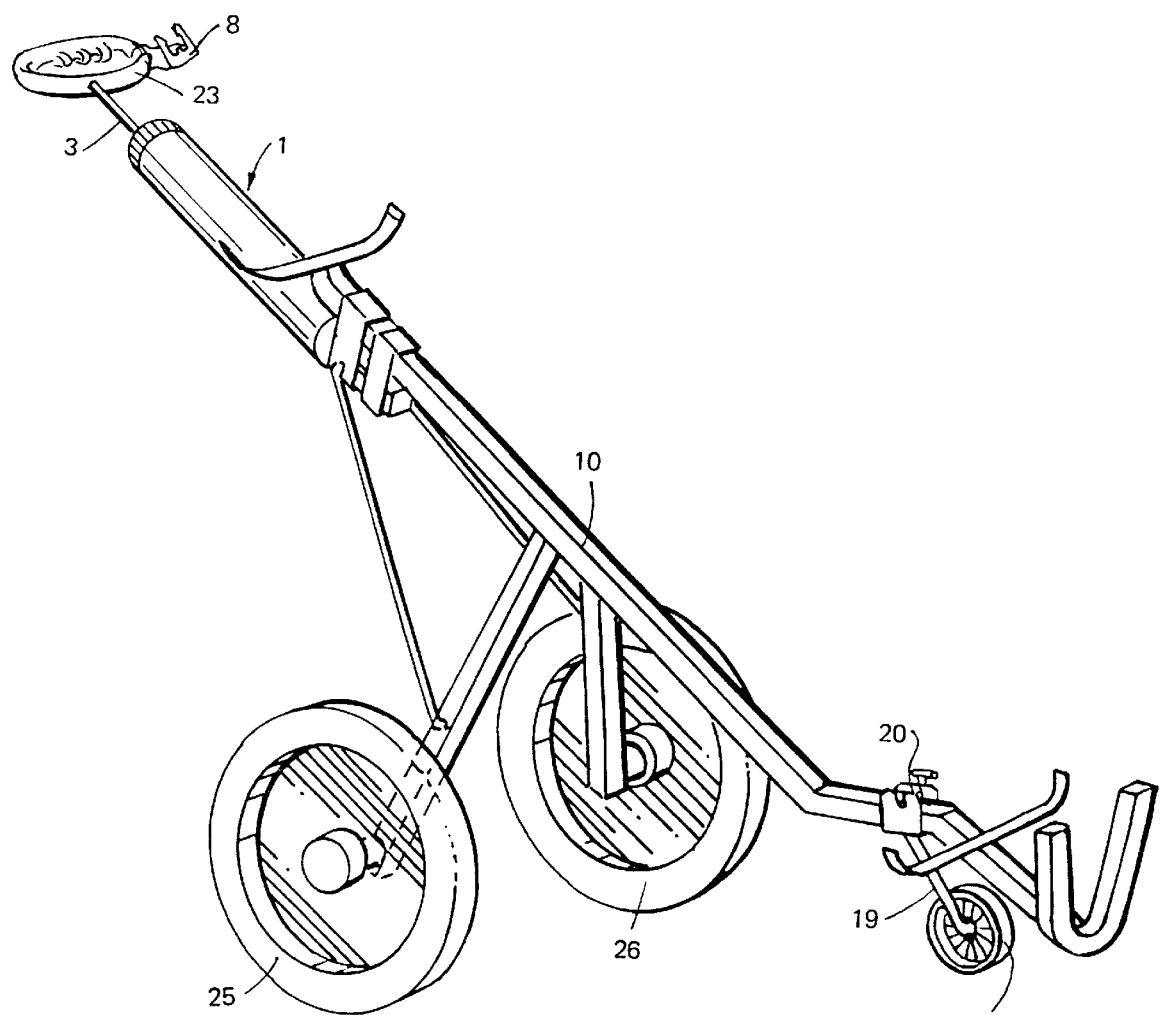
FIG. 2 shows a pictorial view of a second embodiment of a towing device of the invention, in which the towing device forms the handle of the trolley.

In an alternative embodiment of the invention shown in FIG. 2 the towing device 1 forms part of the handle 13 on the trolley 10, being pivotably attached to the frame of trolley 10 at the upper end of the bag-carrying part. The hand grip 23 is directly attached to piston 3 and the clip 8 is mounted on the handle. The extra wheel 18 is also fitted in this case as trolley 10 is a two-wheeled trolley. Incorporating the towing device 1 in the trolley 10 will avoid the necessity in some cases to remove towing device 1 in order to fold trolley 10 into its storage position. The towing device 1 is free to pivot when in use but may be set in a rigid position if it is required to use the handle for towing by hand.

Clip 8 may be pivotably attached to piston 3 or in the second embodiment described to handgrip 23 in such a manner to allow the user to turn to face the trolley in order to remove a club, towel etc. from the golf bag, and the towing device 1 is pivotably attached to trolley 10 to compensate for the up-and-down motion of the trolley 10 due to inclined surfaces etc.

FIGS. 4 and 5 show a side view of an alternate towing device 51 which may be used to tow conventional trollies. The device 51 comprises telescopic cylinders 52 and 56 housing a piston rod 53 and a flexible seal 54 in the form of an O-ring set in a groove around the circumference of piston head 55. The device also has a coiled compression spring 57 around the piston.

A handle 73 is attached to the closed end of outer cylindrical casing 52, and the piston rod 53 is secured to the inner surface of the same closed end. The handle 73 is designed as a conventional trolley handle and optionally has a clip mounted at the free end thereof for attachment to the belt of a user as previously described. The piston head 55 travels inside inner cylindrical casing 56 which in turn slides telescopically inside outer cylindrical casing 52. The inner casing 56 has an end cap 58 having a central aperture in which piston rod 53 slides. The spring 57 acts between the end cap 58 and piston head 55. The piston head 55 is circular in end section and its O-ring fits snugly within the interior of inner casing 56. In the rest position inner casing 56 projects beyond an open end 61 of the outer cylindrical casing 52. An end housing member 60 is attached to one end of inner casing 56 and closes that end to form a substantially airtight seal around the inner casing. An auxiliary compression spring 59 is located between a recessed face 62 of the end housing member 60 and the leading face of the piston head 55.

A bracket 63 is pivotably attached to end housing 60. The bracket 63 has a plate 64 which is used to attach the device to a main frame member of the bag-carrying part of the trolley such as shown in FIG. 1(*a*). A screw arrangement 65 allows for adjustment of plate 64 to accommodate various sizes of frame members on different trollies. The bracket 63 is pivotable about a pin 64 which extends through end housing member 60. The pivoting of bracket 63 about pin 64 is controlled by a compression spring 65. When bracket 63 is secured to the bag-carrying part of the trolley, towing device 51 can be pivoted downwardly relative thereto but is urged by spring 63 to return to the rest position of FIG. 4. Spring 65 is held in place by a pin 66 which extends from housing 60 and passes through an aperture in bracket 63.

A valve such as aperture 67 is provided in inner casing 56. The aperture 67 serves to control release of air from inner casing 56.

In FIG. 5 the device 51 is shown in its extended configuration. This is the configuration which is assumed when the trolley is being towed, particularly when extra force is applied to handle 73 such as to overcome the initial inertia to start a stationary trolley moving. Force applied to the handle 73 in the direction of the arrow A causes outer casing 52 to slide telescopically over inner casing 56. The piston head 55 at the end of piston rod 53 is thus moved in the direction of arrow A. As inner casing 56 is attached indirectly to the trolley it does not move relative to the trolley while the device 51 extends. The extension of the device 51 compresses compression spring 57 between the piston head 55 and the end cap 58 of the inner casing 56. The initial inertia of the trolley is first taken up by spring 57 which applies a progressive force to the end wall 58 of inner casing 56. At an equilibrium stage the compressive force applied to spring 57 is equal to the force required to start the trolley moving. Once the trolley has started moving then the device 51 returns toward its equilibrium position shown in FIG. 3 as spring 57 extends, having overcome the initial inertia of the trolley. The return of spring 57 to its equilibrium position is damped by the air trapped between seal 54 and the end 62 of inner casing 56. Air trapped in inner casing 56 is slowly released through valve or aperture 67 at a controlled rate. The rate of release of air from the inner casing 56 is so as to give a smooth relative recoil of the handle 73 and the trolley 10.

If the device is to be used for pushing rather than pulling then piston head 55 applies force to auxiliary compression spring 59 which contracts under the compressive force. Again as described above, spring 59 compresses until an equilibrium is reached with the force applied to it and the force required to move the trolley. The compression spring 59 then extends back towards its normal position having overcome the initial inertia of the trolley. The recoil motion of spring 59 is again damped by the combination of seal 54 and the inner casing 56 which causes air to be drawn into chamber 56 through the aperture 67 again at a controlled rate. Therefore, damping of the recoil motion is again provided.

Figure 6:
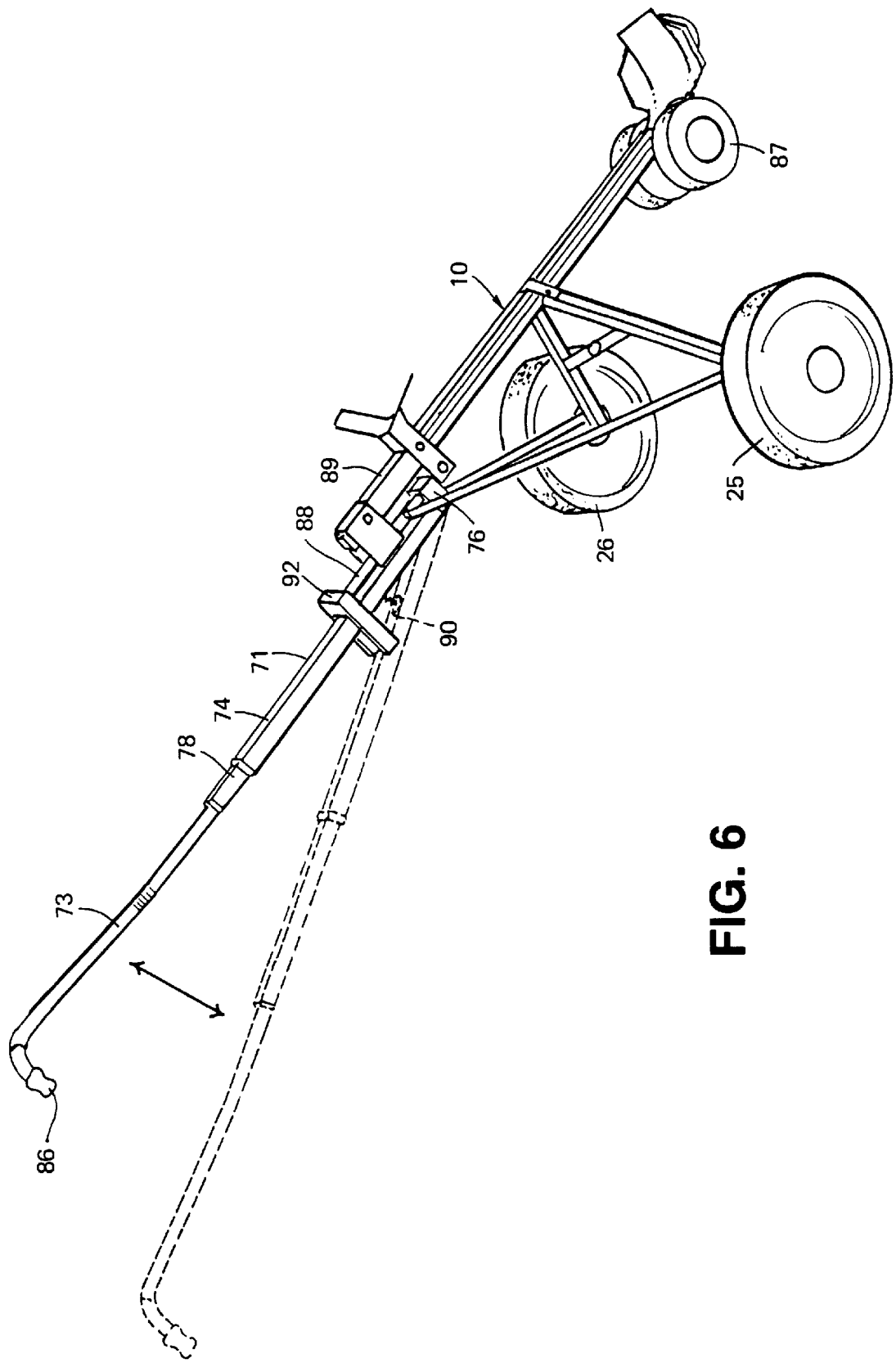
FIG. 6 is a pictorial view of a fourth embodiment in which the towing device forms the handle of the trolley, shown in the rest position, and also shown in dotted outline in the pivoted and extended position.

FIGS. 6–10 show a fourth embodiment of the invention wherein the towing device 71 forms the handle of the trolley. As shown in FIG. 6, the trolley is similar to that of FIG. 2. Instead of a single auxiliary wheel fitted to the bottom of the bag-carrying part, this embodiment uses a pair of auxiliary wheels 87 which may suitably be the conventional wheel pair of a "three-wheeled trolley" moved to a slightly higher position on the frame of the trolley.

Figure 7:
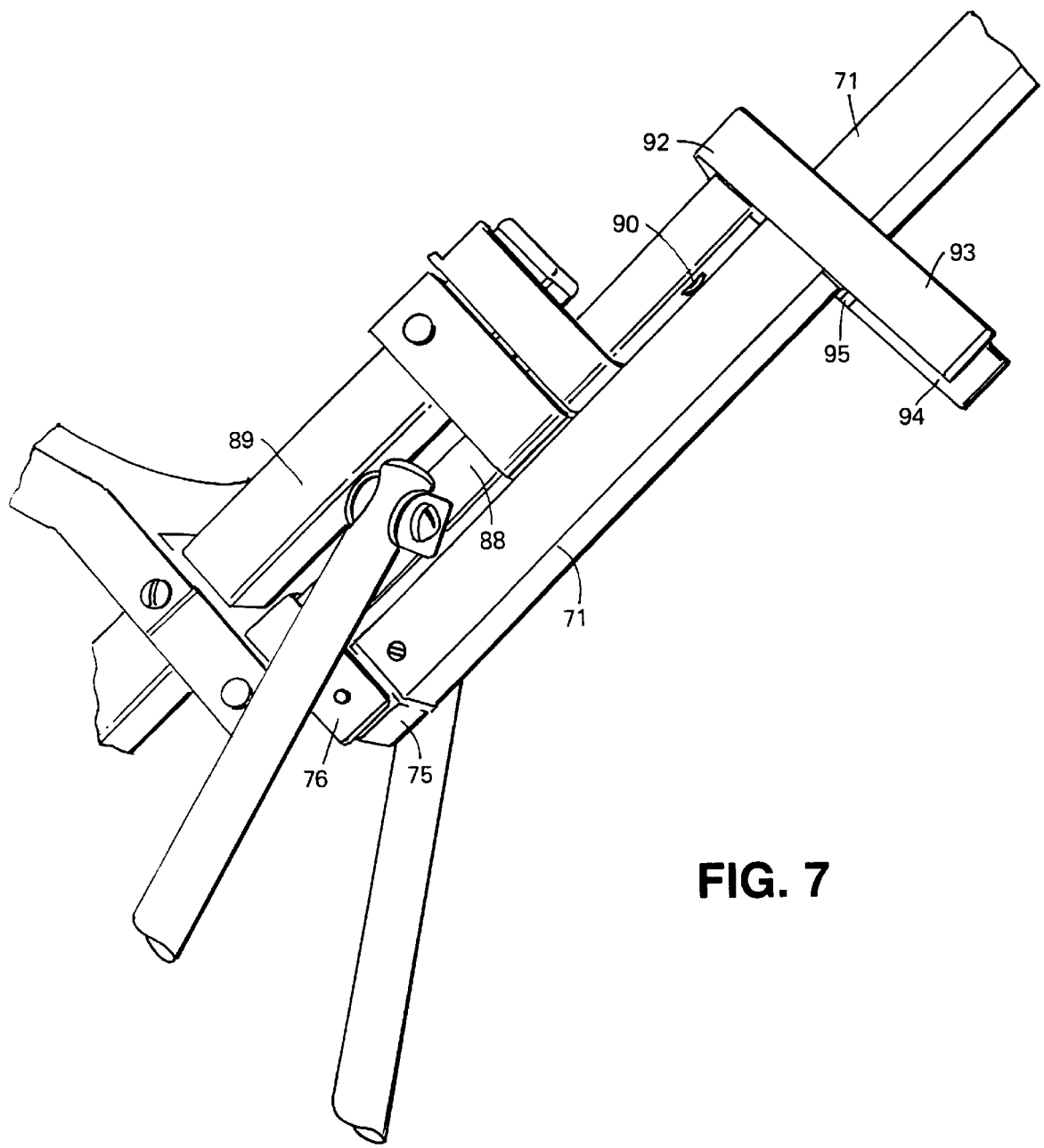
FIG. 7 is a pictorial view from below and one side of part of the trolley of FIG. 6, shown in the rest position.
Figure 8:
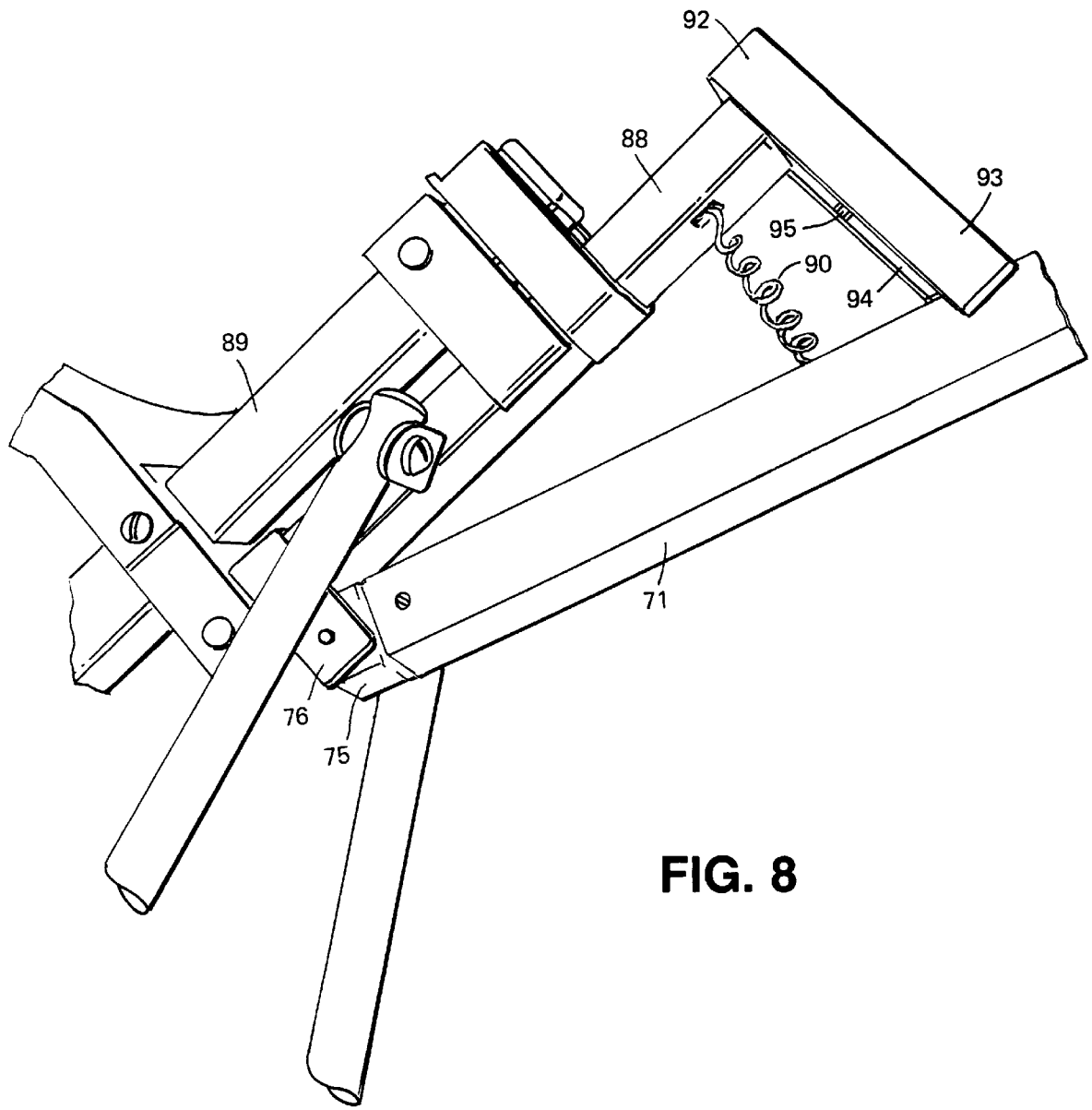
FIG. 8 is a view similar to FIG. 7, showing the pivoted position.

The towing device 71 is pivotable relative to the bag-carrying part of the trolley and the device extends when the handle 73 is pulled either manually or by attachment to a belt (or other mounting device) on the user's clothing using clip 86 (optional). The pivoting arrangement is shown in FIGS. 7 and 8. The towing device 71 is pivotally attached to a bracket 76 which is secured to a frame member 88 fixed below the bag-carrying spine 89 of the trolley. The extent of pivotal movement of the towing device 71 is restricted by a spring 90 which is mounted in a bore 91 in the frame member 88 and has one end attached to the frame member 88 and the other end attached to the towing device 71.

An inverted U-shaped guide 92 extends downwardly from the frame member 88. The towing device is embraced by and is moveable between the limbs 93, 94 of this guide. A pair of opposing ribs 95 are provided on the inside surfaces of the limbs 93, 94 to retain the towing device 71 in the rest position shown in FIG. 7 by snap-fit engagement. In an alternative embodiment (not shown), the limbs of the guide 92 (or the portions of them below the ribs 95) are angled rearwardly so that they are perpendicular to the towing device in the position of FIG. 8. In another alternative embodiment (not shown), the guide 92 may have a base portion bridging the ends of the limbs 93, 94 so as to restrict the pivotal movement of the towing device.

Figure 9:
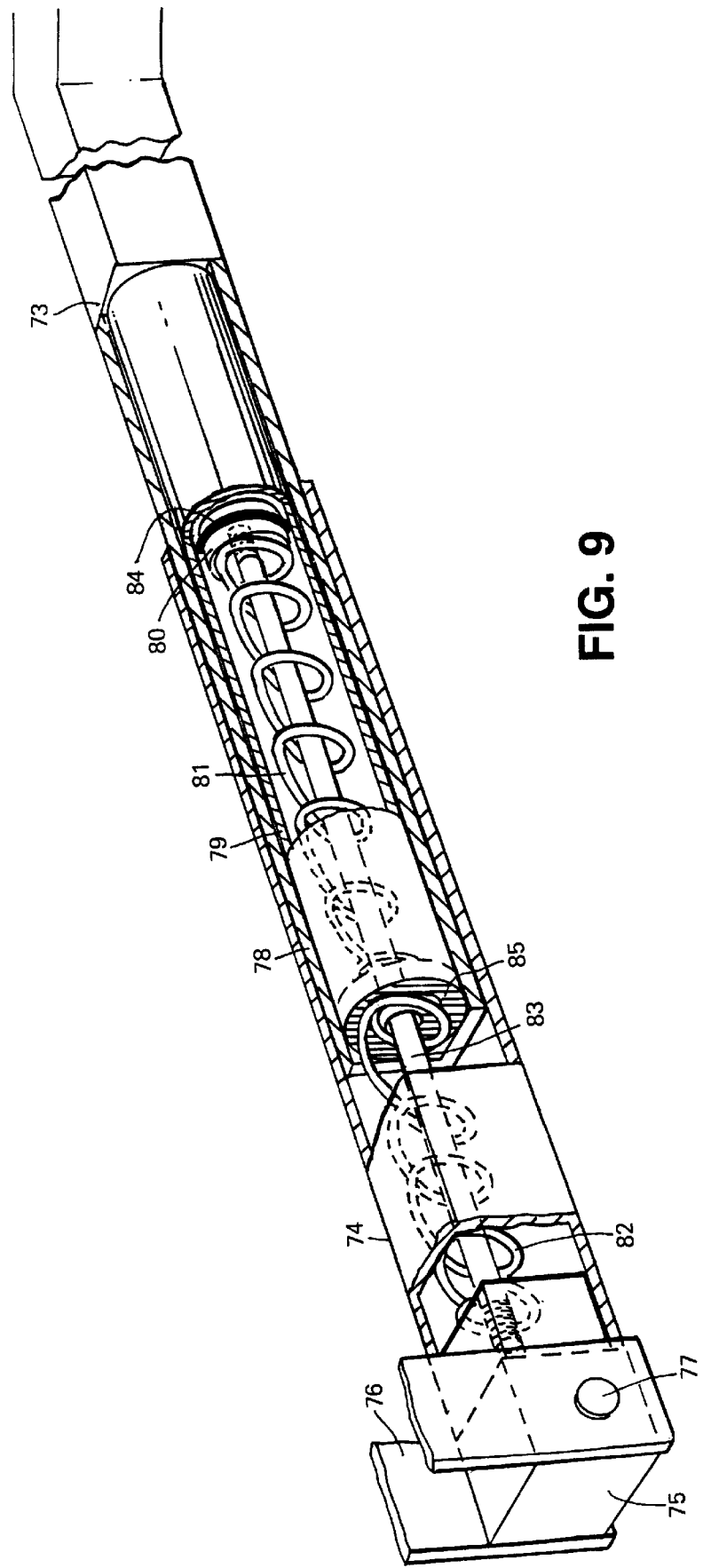
FIG. 9 is a diagrammatic plan view, partly in cross-section and not to scale, of part of the trolley of FIG. 6, shown in the rest position.
Figure 10:
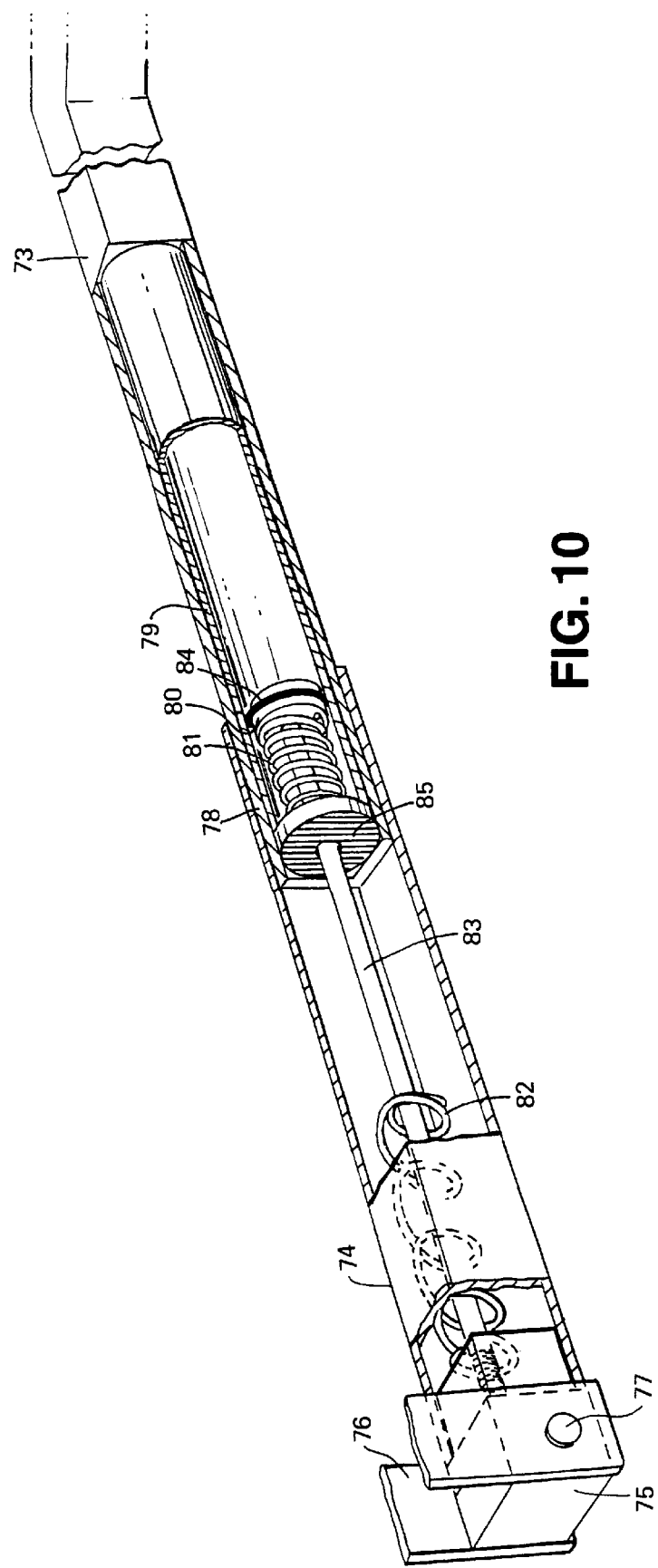
FIG. 10 is a view similar to FIG. 9, showing the device in the extended position.

The detailed construction and operation of the towing device 71 is illustrated in FIGS. 9 and 10.

The device is inverted as compared to the device shown in FIG. 4 and 5. An outer square section tubing 74 is attached to a mount 75 which in turn is pivotally attached to the bracket 76 on the trolley. The device 71 is pivotable about a pin 77. The piston rod 83 is screw-threaded into the mount 75. The piston rod 83 extends through an inner tubular casing 78 which can slide telescopically within the outer casing 74. The inner casing 78 houses a cylinder 79 which is secured therein. The piston rod 83 extends into the cylinder 79 and has a piston head 80 attached to its end. Piston head 80 also has a seal 84 attached thereon. A compression spring 81 is located within the cylinder 79. A second coiled compression spring 82 is located between the mount 75 and one end 85 of the cylinder 79. As the handle 73 is pulled this in turn pulls inner casing 78 and the cylinder 79 therein along piston rod 83.

The compression spring 81 located between the end 85 of the cylinder 79 and the piston head 80 is compressed by the telescopic movement of inner casing 78 within outer casing 74. The inertia of the trolley is thus taken up by spring 81. Similarly, when handle 73 is pushed the compressive force is taken up by spring 82. The release of compressive force on the springs is as described above for the previous embodiments i.e. the seal 84 and a valve aperture (not shown) in casing 78 and cylinder 79 providing a damper counteracting the sudden recoil of either of the two springs. The extended position of the device 71 is shown in FIG. 10. In an alternative arrangement the device may comprise a number of telescopic tubes one within the other.

Figure 11:
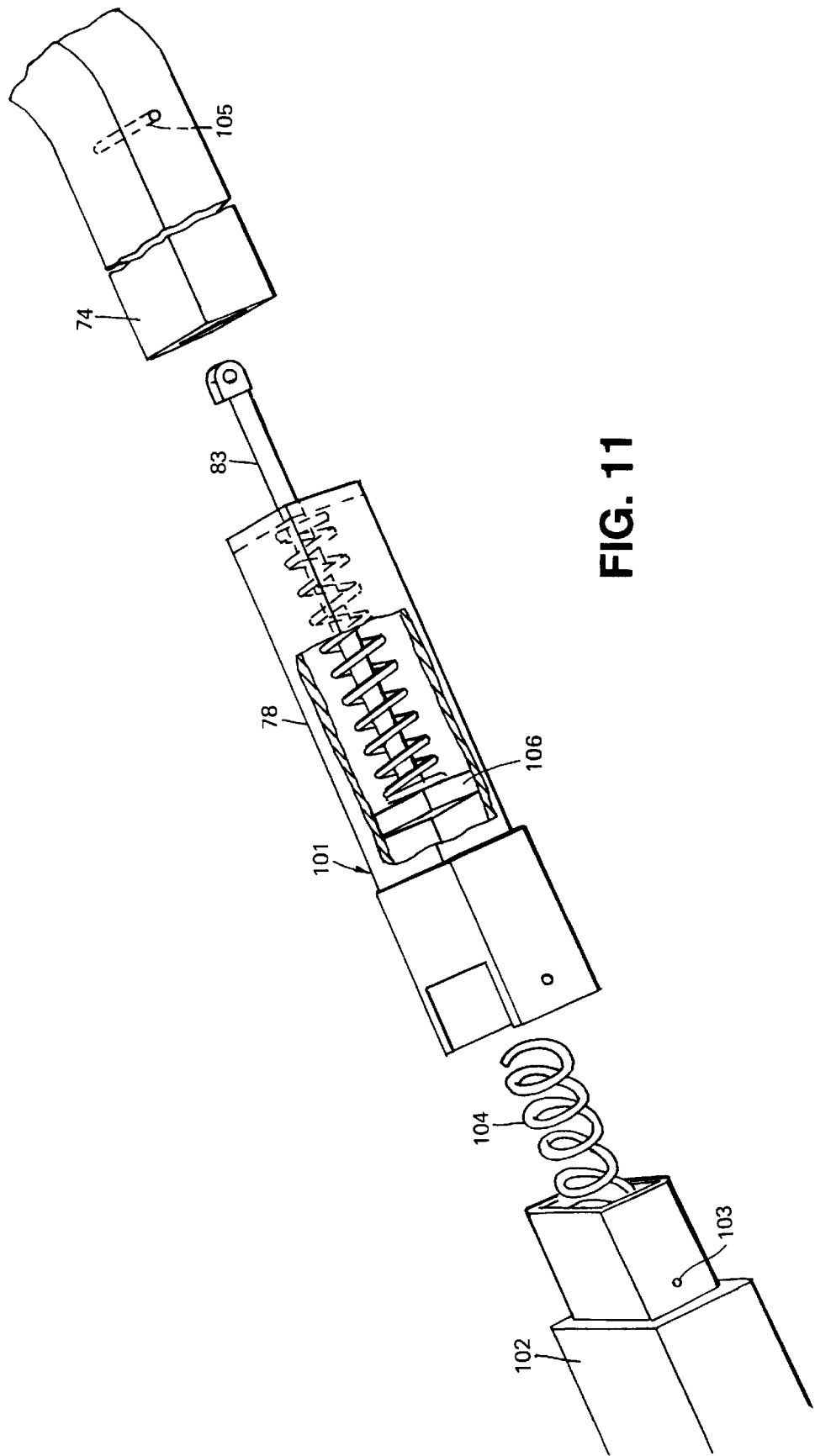
FIG. 11 is an exploded pictorial view, partly in cross-section of a fifth embodiment.

FIG. 11 shows a further alternative embodiment in which the towing device 101 is pivotably attached to the end of a trolley frame member 102 by means of a pivot 103. A spring 104 projecting from a recess in the front end of the frame member 102 is received in an opposite recess in the rear end of the towing device 101. Pivotal movement of the towing device 101 relative to the trolley frame member 102 is restricted by the spring 104, which biases the towing device back to the rest position in which it is aligned with the frame member.

In this embodiment, the inner casing 78 does not house a cylinder but the piston head 106 is square in shape so that it fits sealingly inside the inner casing 78. The other end of the piston rod 83 is fixed to a pin 105 inside the outer casing 74.

In alternative embodiments (not shown) the pivotal attachment of the towing device to the trolley frame member may be achieved without a pivot pin, using a spring or flexible link e.g. of rubber.

The resilient portion may comprise a tension spring enclosed within a flexible diaphragm or bellows e.g. of rubber which defines an air chamber. A valve permits controlled entry or exit of air to and from the chamber. When the handle is pulled the tension spring extends but its recoil is damped by the flexible diaphragm or bellows.

As described above with reference to FIG. 2, the towing device 1 incorporated in the handle is free to pivot when in use but may be set in a rigid position if it is required to use the handle for towing by hand. The embodiment of FIGS. 6–10 includes an inverted U-shaped guide 92 extending downwardly from the trolley frame member 88 (see FIGS. 7 and 8). The towing device 71 which forms the handle of the trolley is embraced by and is moveable between the limbs 93,94 of this guide. A pair of opposing ribs 95 on the inside surfaces of the limbs 93,94 can retain the towing device in the rest position shown in FIG. 7 by snap-fit engagement. The towing device is urged towards the rest position by spring 90, which also restricts the extent of pivotal movement of the towing device. In an alternative embodiment which is described above but not shown, the guide 92 may have a base position bridging the ends of the limbs 93,94 so as to restrict the pivotal movement of the towing device.

While the ribs 95 in FIG. 7 provide a satisfactory snap-fit engagement to inhibit pivotal movement of the handle relative to the bag-carrying part of the trolley, they do not affect the damped telescopic movement of the towing device. For control of the trolley, particularly when it is being manoeuvred over difficult terrain or off the course, and more particularly when it is being pushed, there is a desire to set the towing device in a rigid position for both to-and-fro movement and pivotal movement.

FIGS. 12 to 15 show an alternative catch mechanism to that described in particular with reference to FIGS. 7 and 8 above.

Figure 12:
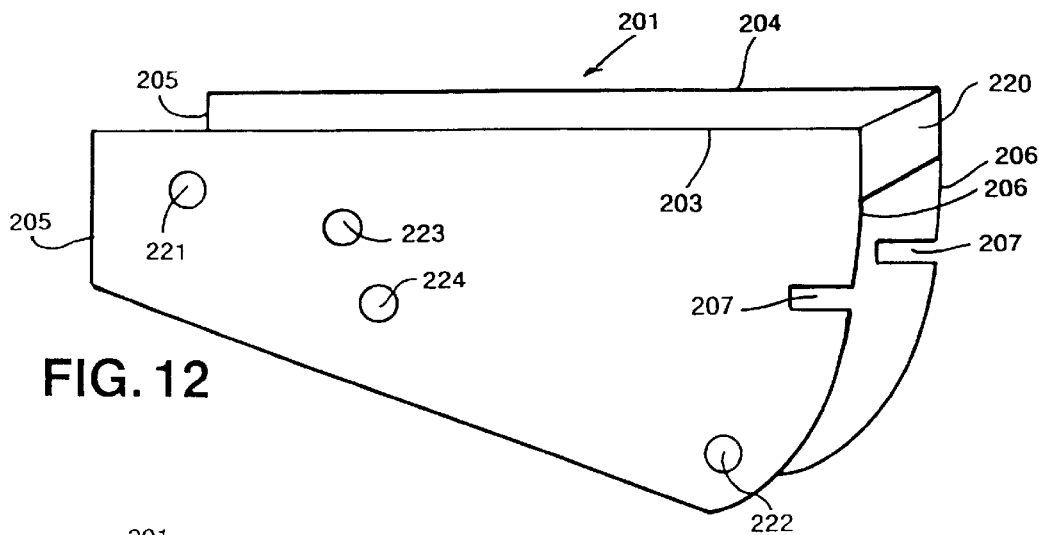
FIG. 12 is a side view of a guide which connects the handle of the trolley to the trolley.

FIG. 12 shows a side view of a guide 201 which is attached at two connection points 221, 222 to the frame of the golf trolley. The rearmost connection point 221 connects the guide 201 to a main frame member. The foremost connection point 222 connects a stay arm (from the wheels) of the trolley to the guide.

The guide 201 has two flat spaced-apart limbs in the form of plates 203,204. The plates 203,204 are identically shaped each having a relatively short angular end 205, and diverging to a curved front end 206. Each front end 206 has a notch or slot 207 in which a catch-plate 210 (FIG. 13) is engageable. The handle 209 is pivotably connected to the guide 201 and thus the trolley by a pin 223 which extends through the guide 201 (see FIG. 12). A second pin 224 extends through the guide 201. The pin 224 extends through an aperture in a spring (not shown) holding the spring in place. The spring has splayed resiliently deformable arms which are arranged to bias the handle 209 upwards in the direction of the arrow C.

Figure 13:
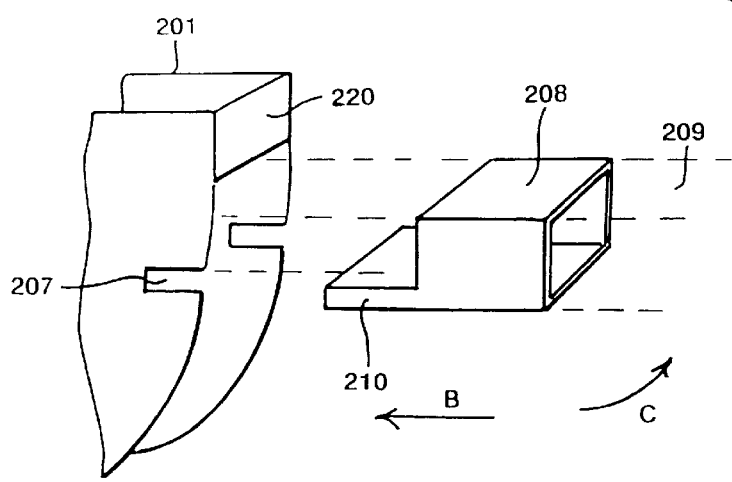
FIG. 13 is a side view of a mechanism for locking the handle against pivotal movement.

FIG. 13 shows a side view, of a part of the quick release mechanism of the invention. The catch piece 208 is rectangular in shape, having a rectangular aperture which fits around the outer tube 212 of the handle 209.

The catch piece 208 has a projecting catch plate 210 which projects rearwardly beneath the handle 209 and which is engageable in slots 207. In the towing position shown in dashed outline in FIG. 6, the catch plate 210 and the slots 207 are not aligned. To engage the catch plate 210 in the slots 207 it is necessary to move the handle to a rest position such as the position shown in FIG. 6 in continuous outline. When the catch plate 210 is engaged in the slots 207, the handle 209 is held in a position fixed against pivoting relative to the trolley. Removal of the catch plate 210 from the slots 207 allows the handle 209 to pivot freely about pin 223, between the two flat plates 203,204 of the bracket 201. A stop 220 extends between the plates 203,204 to limit the degree of movement of the handle 209.

In the configuration shown the catch plate 210 is held away from the slots 207 by the bias of the spring mechanism of the damper. However a locking mechanism is provided to overcome the bias of the catch away from the slots 207. In a normal towing position of the trolley the handle 209 extends from the trolley at a larger angle relative to the rest position due to the freedom of the handle 209 to pivot. In the normal towing configuration the handle would have a position similar to that shown in dashed outline in FIG. 6.

Figure 14:
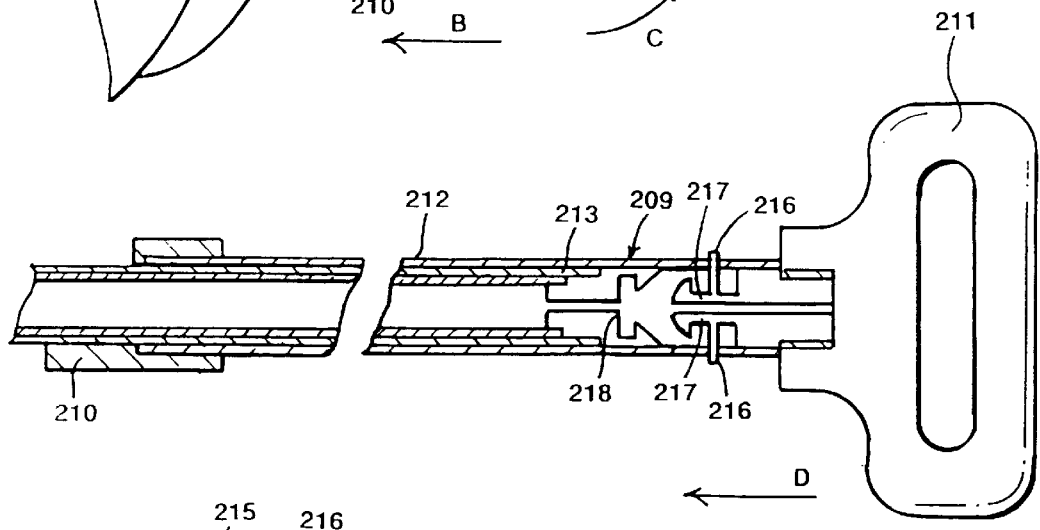
FIG. 14 is a vertical cross-section of the mechanism of FIG. 13 together with a locking mechanism for preventing telescopic motion of the handle.
Figure 15:
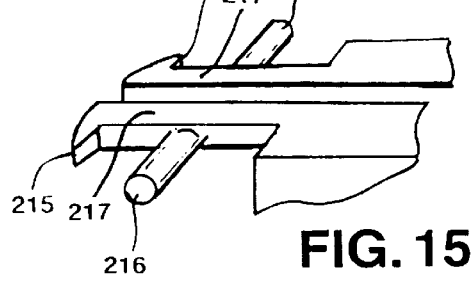
FIG. 15 is an enlarged perspective view of the clip forming part of the mechanism of FIG. 14.

The locking mechanism is shown in more detail in FIGS. 14 and 15.

In FIG. 14 the handle 209 is shown in more detail. The handle 209 has a hand-grip 211. The hand-grip 211 is fixed to a telescopic arrangement comprising an outer telescopic tube 212 which slides on an inner tube 213. As indicated diagramatically in FIG. 14 the inner tube 213 is attached to the trolley (not shown). The point of attachment is a pivot point about pin 223 so that the entire handle 209 can pivot about this point of attachment.

The outer tube 212 slides on the inner tube 213, the catch piece 208 forming in part a bearing-type arrangement allowing smooth movement of the outer tube 212 over the inner tube 213. It is the relative movement of the inner tube 213 and the outer tube 212 which is damped. In FIG. 14 the hand-grip 211 is shown in an upright position for the sake of clarity. In the operational position of the trolley it could be disposed horizontal.

The locking mechanism is of a commercially available type, such as is used for rucksacks, luggage straps and the like. It comprises an arrow-head shaped clip 214 made of a resiliently deformable material such as a plastics material. The clip 214 has two opposing half-arrow shaped portions 215 which are spaced apart from each other, and each is attached to the outer tube of the handle 209 by a stem 217. Two projecting members 216, one on each of stems 217, and disposed perpendicularly to the stems project through apertures in the outer tube 212 and stand proud of the exterior surface of the outer tube. Pressing on the protruding ends of the projecting members 216 forces the two half-arrow heads 215 together.

The two half-arrow heads 215 are complementary to a clip receiver 218. The two half-arrow heads 215 of clip 214 snap into engagement in the clip receiver 218 when the handle is compressed in the direction indicated by the arrow D. As described above the catch plate 210 will only engage the slots 207 when the handle is in the correct angular position i.e. the rest position. It will not engage when the handle is in a lower towing position. Indeed the catch plate 210 being fixed to the outer tube 212 prevents accidental locking of the clip 214 and the clip receiver 218. The catch plate 210 limits the amount of movement of the handle 209 by abutting the curved ends 206 of the retaining bracket 201 thus acting as a stop to limit the compression of the handle. The catch plate 210 is arranged to abut the curved ends 206 at a position of the handle 209 which prevents the clip 214 engaging in the clip receiver 218. Only when the catch plate 210 is aligned with the slots, is the extra compression of the handle required achieved, as the end plate 210 moves in to the slots 207, allowing sufficient further longitudinal movement of the handle 209 to engage the clip 214 in the clip receiver 218. Release of the clip 214 from the clip receiver is effected by pressing on the two protruding ends of projecting members 216 (see above). The clip receiver 218 is located on the inner surface of the inner tube 212, so that when the handle 209 is in the locked position, the catch plate 210 is held in place in grooves 207, locking the handle 209 against pivotal movement.

When the handle 209 is in the locked position the damping effect is lost as the outer tube 212 no longer moves telescopically over inner tube 213. The inner tube 213 and the outer tube 212 are locked together. As the towing device provides a damping effect between relative movement of the inner and outer tubes, this effect is lost when the inner and outer tubes are locked to each other. This is advantageous when lifting the trolley or otherwise negotiating obstacles etc.

Locking the handle 209 thus has two simultaneous effects, namely preventing pivotal movement of the handle 209 and locking the handle against the damped in-and-out motion.

The clip 214 is shown as an exploded view in FIG. 15 where its structure is more easily seen.

The embodiment of FIGS. 12 to 15 resembles the arrangement of FIGS. 6 and 7 where the handle has a single pivot point, and also has a catch mechanism to hold the handle in a desired position. The embodiment of FIGS. 12 to 15 also includes a biasing mechanism to bias the handle upwards in a manner similar to that shown for example for FIG. 7, though as explained above the bias is provided by the splayed arms of a torsion spring, rather than the retractive force of an extension spring.

INDUSTRIAL APPLICABILITY

The invention provides either an accessory for a golf trolley or a novel form of golf trolley, suitable for manufacture and sale to golfers.

What is claimed is:

1. A golf trolley comprising:
   a bag-carrying part for carrying a golf bag,
   a longitudinal handle having a first end and a second end,
   a hand grip at the first end of the handle, and
   attachment means at the second end of the handle, the handle being attached to the bag-carrying part by the attachment means,
   wherein the handle has a longitudinally resilient portion and a damper for the resilient portion,
   the remainder of the handle being rigid.

2. A trolley according to claim 1 wherein the attachment means are pivotal attachment means for pivotal movement of the handle relative to the bag-carrying part of the trolley during use for towing.

3. A golf trolley according to claim 2 characterised by a spring mechanism to restrict the extent of pivotal movement of the towing device relative to the bag-carrying part of the trolley.

4. A golf trolley according to claim 2 wherein the trolley further comprises an auxiliary wheel fitted to the bottom of the bag-carrying part.

5. A golf trolley according to claim 2 wherein the handle is free to pivot when in use, but may be set in a rigid position relative to the bag-carrying part of the trolley.

6. A golf trolley according to claim 5 wherein the trolley is provided with means to lock the handle against pivotal movement relative to the bag-carrying part and against damped resilient movement of the resilient portion.

7. A golf trolley according to claim 6 wherein the handle is telescopic, comprising at least two tubes which are slidable relative to each other between a retracted and an extended position and a spring which biases the tubes toward the extended position, the golf trolley further comprising means to lock the handle against telescopic motion.

8. A golf trolley according to claim 6 wherein the mean to lock the handle against pivotal movement relative to the bag-carrying part comprises a latch mechanism having two co-operating engageable parts one of which is located on the handle, the other being located on the bag-carrying part of the trolley, the co-operating parts of the latch being biased apart by a spring, the co-operating parts being interengageable with each other when the handle is in a desired angular postion relative to the bag-carrying part, the co-operating parts when interengaged releasably securing the handle against pivotal movement.

9. A golf trolley according to claim 8 wherein the handle is telescopic, comprising at least two tubes which are slidable relative to each other between a retracted position and an extended position and means to lock the handle against telescopic motion, the spring biasing the tubes toward the extended position.

10. A golf trolley according to claim 9 wherein the means to lock the handle against telescopic motion is a releasable locking mechanism for locking the two slidable tubes to each other against the biasing action of the spring which biases the tubes towards the extended position, and for simultaneously locking the co-operating parts of the latch mechanism in the interengaged position.

11. A golf trolley according to claim 1 wherein the resilient portion of the handle comprises a coiled spring.

12. A golf trolley according to claim 1 wherein the damper of the towing device comprises a piston-and-cylinder damper.

13. A golf trolley according to claim 1 further comprising means for removably attaching the first end of the handle to a mounting device on a trunk of a user of the trolley.

14. A golf trolley according to claim 13 wherein the mounting device is a belt or other item of clothing.

15. A mechanism for releasably securing a telescopic handle, pivotably attached to a golf trolley, against telescopic motion and against pivotal motion relative to the trolley, the telescopic handle comprising at least two tubes which are slidable relative to each other between a retracted and an extended position and a spring which biases the tubes towards the extended position, and one of the tubes being pivotally coupled at one end thereof to the golf trolley, the mechanism comprising:
   a latch mechanism having two co-operating engageable parts, one of which is located on the handle, the other being located on the trolley, the co-operating parts of the latch being biased apart by the spring which biases the tubes towards the extended position, the co-operating parts being interengageable with each other when the handle is in a desired angular position relative to the trolley, the co-operating parts when interengaged releasably securing the handle against pivotal movement; and
   a releasable locking mechanism for simultaneously locking the co-operating parts of the latch mechanism in the interengaged position and locking the tubes to each other preventing telescopic motion, against the biasing action of the spring which biases the tubes toward the extended position.

16. A mechanism according to claim 15 wherein the co-operating parts are a projecting portion and a recess for accommodating the projecting portion.

17. A mechanism according to claim 15 wherein the locking mechanism comprises a clip coupled to one tube and a clip receiver coupled to the other tube, the clip and clip receiver being interengageable.

\* \* \* \* \*